United States Patent
Tseng et al.

(10) Patent No.: US 10,118,150 B2
(45) Date of Patent: Nov. 6, 2018

(54) REACTOR AND TEMPERATURE CONTROL METHOD THEREOF

(71) Applicant: National Tsing Hua University, Hsinchu (TW)

(72) Inventors: Fan-Gang Tseng, Taipei (TW); Chun Liu, Taichung (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/345,175

(22) Filed: Nov. 7, 2016

(65) Prior Publication Data
US 2017/0282149 A1 Oct. 5, 2017

(30) Foreign Application Priority Data
Mar. 31, 2016 (TW) .............................. 105110407 A

(51) Int. Cl.
*B01J 19/24* (2006.01)
*B01J 19/00* (2006.01)
(Continued)

(52) U.S. Cl.
CPC ............... *B01J 19/245* (2013.01); *B01J 7/00* (2013.01); *B01J 7/02* (2013.01); *B01J 19/0013* (2013.01);
(Continued)

(58) Field of Classification Search
CPC ...... B01J 19/245; B01J 19/249; B01J 19/248; B01J 19/0013; B01J 19/002;
(Continued)

(56) References Cited

U.S. PATENT DOCUMENTS 3,856,927 A * 12/1974 Silveston ................ C01B 17/69
423/532
6,960,684 B2    11/2005 Yunoki
(Continued)

FOREIGN PATENT DOCUMENTS

| CN | 101754926 | 6/2010 |
| TW | 583022 | 4/2004 |
| TW | I357352 | 2/2012 |

OTHER PUBLICATIONS

Liu et al., "High Performance reformer for the Partial Oxidation of Methanol by gradient concentration of catalysts," The 11th Annual IEEE International Conference on Nano/Micro Engineered and Molecular Systems (IEEE-NEMS 2016), Apr. 2016, pp. 1-4.
(Continued)

*Primary Examiner* — Lessanework Seifu
(74) *Attorney, Agent, or Firm* — J.C. Patents

(57) ABSTRACT

A reactor suitable for a reaction containing an exothermic reaction is provided. The reactor includes the following components. A reaction channel has an inlet and an outlet, and has a front-end reaction zone, middle-end reaction zones, and a back-end reaction zone from the inlet to the outlet. A front-end catalyst support and a front-end catalyst are located in the front-end reaction zone, a middle-end catalyst support and a middle-end catalyst are respectively located in the middle-end reaction zones, and a back-end catalyst support and a back-end catalyst are located in the back-end reaction zone. The concentration of the front-end catalyst is less than the concentration of the back-end catalyst, and the concentration of the middle-end catalyst is decided via a computer simulation of reaction parameters. The reaction parameters include size and geometric shape of the reaction channel.

12 Claims, 4 Drawing Sheets

(51) Int. Cl.
  *B01J 7/02*    (2006.01)
  *B01J 7/00*    (2006.01)
  *C01B 3/40*    (2006.01)
  *C01B 17/00*   (2006.01)

(52) U.S. Cl.
  CPC ............... *B01J 19/249* (2013.01); *C01B 3/40* (2013.01); *C01B 17/00* (2013.01); *B01J 2219/00063* (2013.01); *B01J 2219/00159* (2013.01); *B01J 2219/24* (2013.01); *C01B 2203/0233* (2013.01); *C01B 2203/0261* (2013.01); *C01B 2203/0883* (2013.01); *C01B 2203/1011* (2013.01); *C01B 2203/1029* (2013.01); *C01B 2203/1223* (2013.01); *C01B 2203/1247* (2013.01); *C01B 2203/143* (2013.01); *C01B 2203/1614* (2013.01)

(58) Field of Classification Search
  CPC .......... B01J 19/0033; B01J 2219/00159; B01J 2219/00193; B01J 2219/00245; B01J 2219/00247; B01J 2219/24
  See application file for complete search history.

(56) References Cited

U.S. PATENT DOCUMENTS

| | | | |
|---|---|---|---|
| 7,012,103 B2* | 3/2006 | Espinoza | B01J 8/06 518/706 |
| 2009/0026420 A1 | 1/2009 | Xu | |
| 2011/0166304 A1* | 7/2011 | Zanthoff | B01J 8/067 526/75 |

OTHER PUBLICATIONS

Wang et al., "Experiment of catalyst activity distribution effect on methanol steam reforming performance in the packed bed plate-type reactor," Energy, Jan. 2013, pp. 267-272.
Wang et al., "A study of methanol steam reforming on distributed catalyst bed," International Journal of Hydrogen Energy, Mar. 2013, pp. 10788-10794.
Zhou et al., "Hydrogen production from methanol steam reforming using porous copper fiber sintered felt with gradient porosity," International Journal of Hydrogen Energy, Nov. 2014, pp. 244-255.
Tang et al., "Modeling of a fixed-bed copper-based catalyst for reforming methanol: Steam and autothermal reformation," International Journal of Hydrogen Energy, May 2015, pp. 8034-8050.

\* cited by examiner

REACTOR AND TEMPERATURE CONTROL METHOD THEREOF

CROSS-REFERENCE TO RELATED APPLICATION

This application claims the priority benefit of Taiwan application serial no. 105110407, filed on Mar. 31, 2016. The entirety of the above-mentioned patent application is hereby incorporated by reference herein and made a part of this specification.

BACKGROUND OF THE INVENTION

Field of the Invention

The invention relates to a reactor and a temperature control method thereof and more particularly, to a reactor suitable for a reaction containing an exothermic reaction and a temperature control method thereof.

Description of Related Art

When applied in an exothermic reaction, or a reaction composed of exothermic and endothermic reactions, the catalyst often generates a hot spot effect, that is, the heat released by the exothermic reaction generates hot spots in the catalyst to induce peroxidation or trigger catalyst sintering, thus causing failure to the catalyst. Moreover, the hot spot effect increases the yield of harmful byproducts in certain exothermic reactions. Specifically, the hot spot effect often occurs in a zone having a high reaction concentration in a reactor, in particular the entrance of the reactor.

Currently, the method of inhibiting the hot spot effect includes reducing the catalyst concentration or the catalyst activity close to the inlet of the reactor, and adopting a high-thermal conductivity material to manufacture the reactor or reducing the size of the reactor. However, in terms of reducing the catalyst concentration or the catalyst activity close to the inlet of the reactor, in a reactor having a reaction channel having a complex geometry shape, local heat dissipation is not uniform throughout the reactor. For instance, local high temperature readily occurs in the center of a reactor having a spiral reaction channel. Therefore, when the above method is applied in such type of reactor, only the hot spot effect at the entrance can be inhibited, and the issue of local high-temperature generation in other zones in the reactor cannot be solved. Moreover, in terms of a method adopting a high-thermal conductivity material to manufacture a reactor or reducing the size of the reactor, the application range of the reactor is limited by the type of the material and the size.

SUMMARY OF THE INVENTION

The invention provides a reactor capable of extending the service life of a catalyst.

The invention provides a reactor temperature control method capable of inhibiting the phenomenon of local high-temperature generation in the reactor.

The invention provides a reactor suitable for a reaction containing an exothermic reaction. The reactor includes a reaction channel, a front-end catalyst support, a middle-end catalyst support, a back-end catalyst support, a front-end catalyst, a middle-end catalyst, and a back-end catalyst. The reaction channel has an inlet and an outlet, and the reaction channel has a front-end reaction zone, middle-end reaction zones, and a back-end reaction zone from the inlet to the outlet. The front-end catalyst support, the middle-end catalyst support, and the back-end catalyst support are respectively located in the front-end reaction zone, the middle-end reaction zones, and the back-end reaction zone. The front-end catalyst, the middle-end catalyst, and the back-end catalyst are respectively located on the front-end catalyst support, the middle-end catalyst support, and the back-end catalyst support. The concentration of the front-end catalyst in the front-end reaction zone is less than the concentration of the back-end catalyst in the back-end reaction zone, and the concentration of the middle-end catalyst in each of the middle-end reaction zones is decided by a computer simulation of reaction parameters. The reaction parameters include size and geometric shape of the reaction channel.

In an embodiment of the invention, the exothermic reaction includes an oxidative steam reforming of methanol, a methanol partial oxidation reaction, a sulfur dioxide oxidation reaction, or an ethylene partial oxidation reaction.

In an embodiment of the invention, the geometric shape of the reaction channel includes spiral, bellow, a microreactor chamber array, or a parallel straight tube array.

In an embodiment of the invention, the front-end reaction zone, the middle-end reaction zones, and the back-end reaction zone can be separately disposed from one another.

In an embodiment of the invention, the materials of the front-end catalyst, the middle-end catalyst, and the back-end catalyst include copper-palladium-cerium-zinc catalyst, copper-manganese-zinc catalyst, vanadium pentoxide, or silver.

In an embodiment of the invention, the materials of the front-end catalyst support, the middle-end catalyst support, and the back-end catalyst support include metal foam, ceramic foam, or ceramic particles.

In an embodiment of the invention, the specific surface area of the front-end catalyst support can be less than or equal to the specific surface area of the back-end catalyst support.

In an embodiment of the invention, the reaction parameters can further include at least one of a reaction heat of the exothermic reaction, concentrations and flow rates of reactants, a thermal conductivity and a specific surface area of the middle-end catalyst support, a thermal conductivity of the middle-end catalyst, and a thermal conductivity of the reaction channel.

In an embodiment of the invention, the concentration of the back-end catalyst can be greater than the concentration of the middle-end catalyst, and the concentration of the middle-end catalyst can be greater than the concentration of the front-end catalyst.

In an embodiment of the invention, the mode of change from the concentration of the middle-end catalyst closest to the inlet to the concentration of the middle-end catalyst closest to the outlet includes monotonically increasing, monotonically decreasing, or a combination thereof.

In an embodiment of the invention, the concentrations of the middle-end catalyst in the middle-end reaction zones can be the same.

In an embodiment of the invention, the concentration of the front-end catalyst and the concentration of the back-end catalyst can be decided by the computer simulation of the reaction parameters.

In an embodiment of the invention, the reaction parameters can further include at least one of thermal conductivities and specific surface areas of the front-end catalyst support and the back-end catalyst support, thermal conductivities of the front-end catalyst and the back-end catalyst, and a thermal conductivity of the reaction channel.

The invention provides a reactor temperature control method, wherein the reactor includes a reaction channel having an inlet and an outlet. The reactor temperature control method is suitable for a reaction containing an exothermic reaction and includes the following steps. The reaction channel is divided into a front-end reaction zone, middle-end reaction zones, and a back-end reaction zone from the inlet to the outlet. A front-end catalyst support, a middle-end catalyst support, and a back-end catalyst support are respectively disposed in the front-end reaction zone, the middle-end reaction zones, and the back-end reaction zone. A computer simulation step is performed, and a concentration of a middle-end catalyst in each of the middle-end reaction zones is calculated according to reaction parameters, and the reaction parameters include size and geometric shape of the reaction channel. The front-end catalyst and the back-end catalyst are respectively formed on the front-end catalyst support and the back-end catalyst support, wherein a concentration of the front-end catalyst in the front-end reaction zone is less than a concentration of the back-end catalyst in the back-end reaction zone. The middle-end catalyst is formed on the middle-end catalyst support according to the concentration of the middle-end catalyst calculated by the computer simulation step.

In an embodiment of the invention, the method of respectively forming the front-end catalyst, the middle-end catalyst, and the back-end catalyst on the front-end catalyst support, the middle-end catalyst support, and the back-end catalyst support includes an immersion method, a coprecipitation method, a precipitation method, a sol-gel method, a polyol method, a chemical vapor deposition method, or a combination thereof.

In an embodiment of the invention, the reaction parameters can further include at least one of a reaction heat of the exothermic reaction, concentrations and flow rates of reactants, a thermal conductivity and a specific surface area of the middle-end catalyst support, a thermal conductivity of the middle-end catalyst, and a thermal conductivity of the reaction channel.

In an embodiment of the invention, the concentration of the back-end catalyst can be greater than the concentration of the middle-end catalyst, and the concentration of the middle-end catalyst can be greater than the concentration of the front-end catalyst.

In an embodiment of the invention, the mode of change from the concentration of the middle-end catalyst closest to the inlet to the concentration of the middle-end catalyst closest to the outlet includes monotonically increasing, monotonically decreasing, or a combination thereof.

In an embodiment of the invention, the concentrations of the middle-end catalyst in the middle-end reaction zones can be the same.

In an embodiment of the invention, the step of performing computer simulation can further include calculating the concentration of the front-end catalyst and the concentration of the back-end catalyst according to reaction parameters. In the step in which the front-end catalyst and the back-end catalyst are respectively formed on the front-end catalyst support and the back-end catalyst support, the concentration of the front-end catalyst and the concentration of the back-end catalyst can be decided according to the calculation results of the computer simulation step.

In an embodiment of the invention, the reaction parameters can further include at least one of thermal conductivities and specific surface areas of the front-end catalyst support and the back-end catalyst support, thermal conductivities of the front-end catalyst and the back-end catalyst, and a thermal conductivity of the reaction channel.

Based on the above, in the reactor and the temperature control method thereof provided by the invention, since the concentration of the front-end catalyst is less than the concentration of the back-end catalyst, the phenomenon of local high-temperature generation in the front-end reaction zone can be effectively inhibited. Moreover, by optimizing the concentration of the middle-end catalyst in each of the middle-end reaction zones according to the results of the computer simulation of the reaction parameters, local high-temperature generation in the middle-end reaction zones caused by high concentration of the middle-end catalyst can be prevented. Therefore, the reactor and the temperature control method thereof provided by the invention can prevent catalyst sintering generated by local high temperature, so as to extend the service life of the catalyst. Moreover, the yield of harmful byproducts in certain exothermic reactions can be reduced. Moreover, the concentration of the middle-end catalyst is calculated by computer simulation, and therefore yield reduction of the exothermic reaction caused by low concentration of the middle-end catalyst can be prevented. Moreover, since the reactor and the temperature control method thereof provided by the invention can be suitable for reactors made of various materials and reactors of various sizes, the range of application thereof can be not limited by the type of the material and the size of the reactor.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
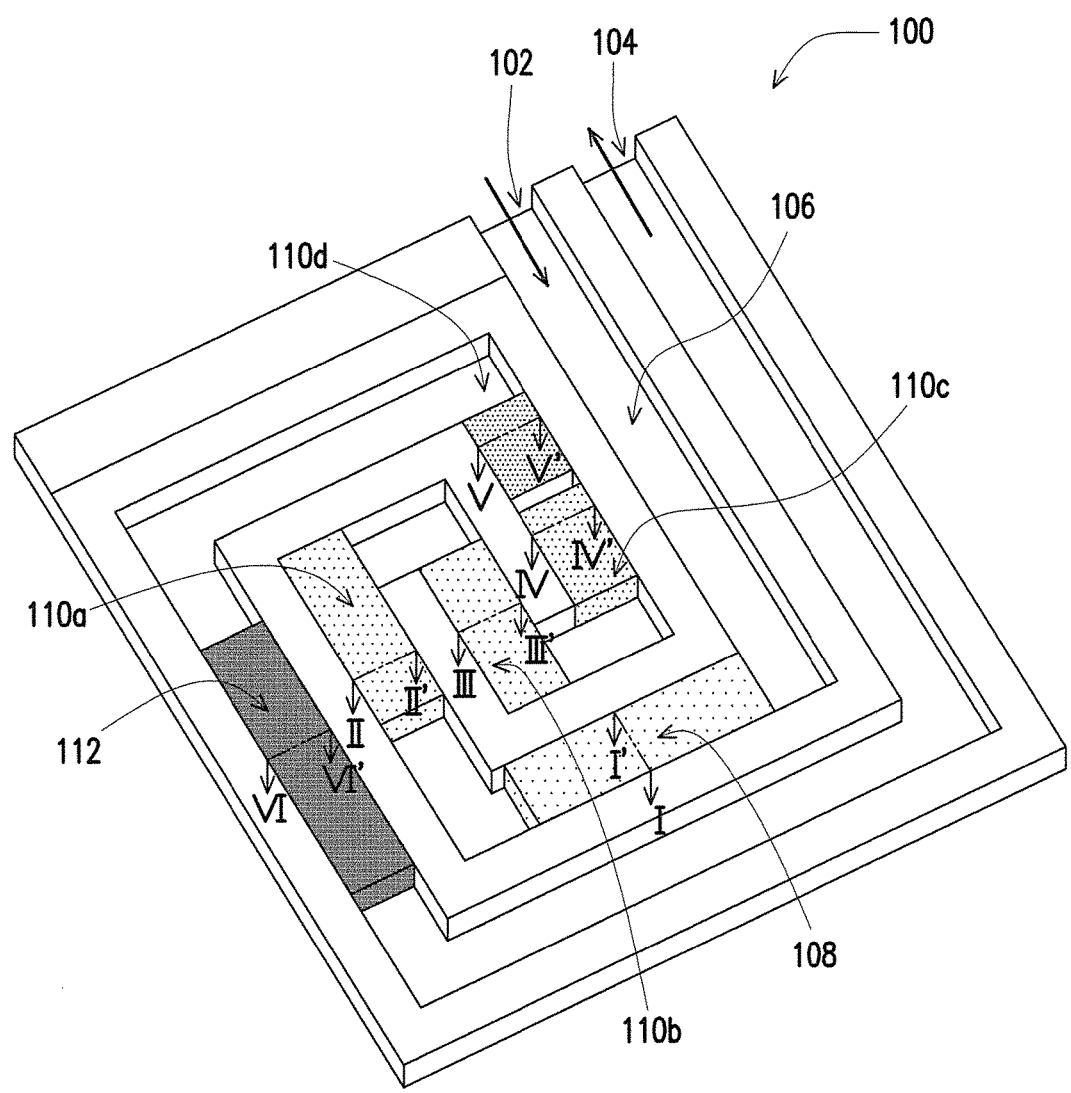
FIG. 1 is a three-dimensional schematic diagram of a reactor according to an embodiment of the invention.
Figure 2A:
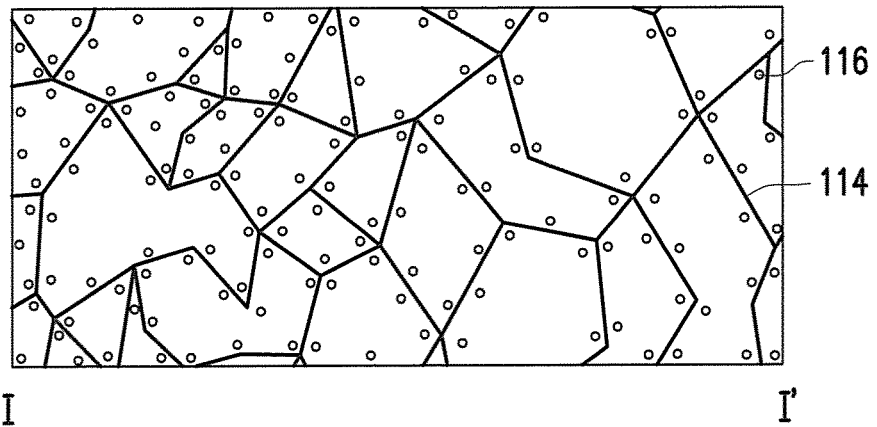
FIG. 2A is a cross-sectional schematic diagram along section line I-I' in FIG. 1.
Figure 2B:
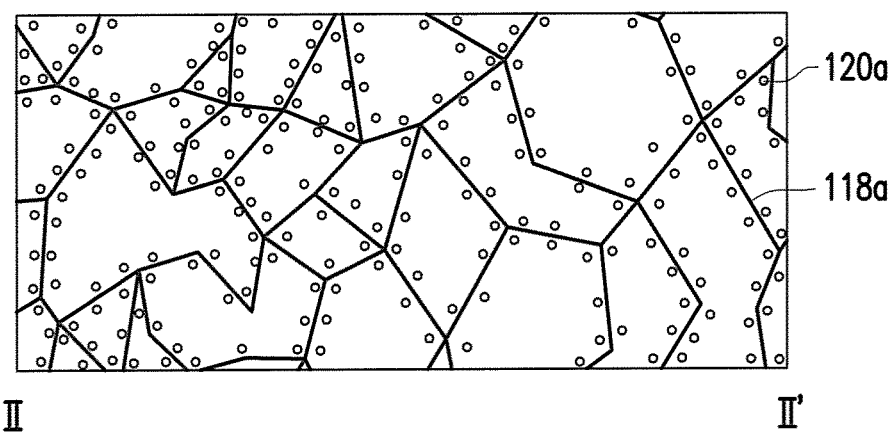
FIG. 2B is a cross-sectional schematic diagram along section line II-II' in FIG. 1.
Figure 2C:
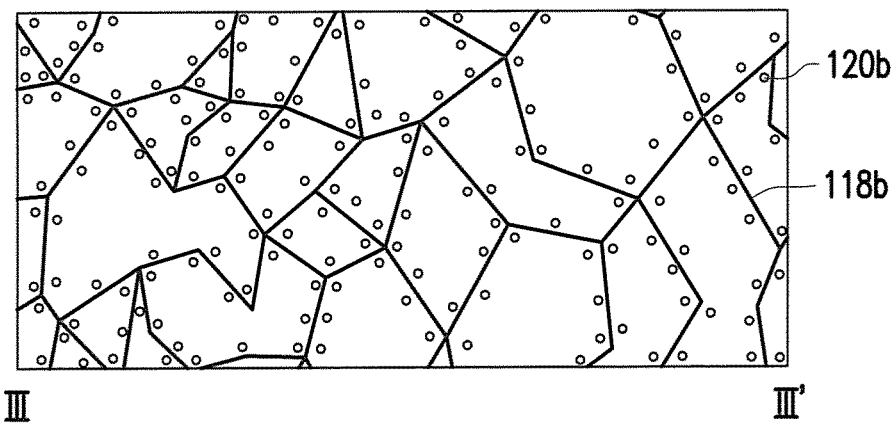
FIG. 2C is a cross-sectional schematic diagram along section line III-III' in FIG. 1.
Figure 2D:
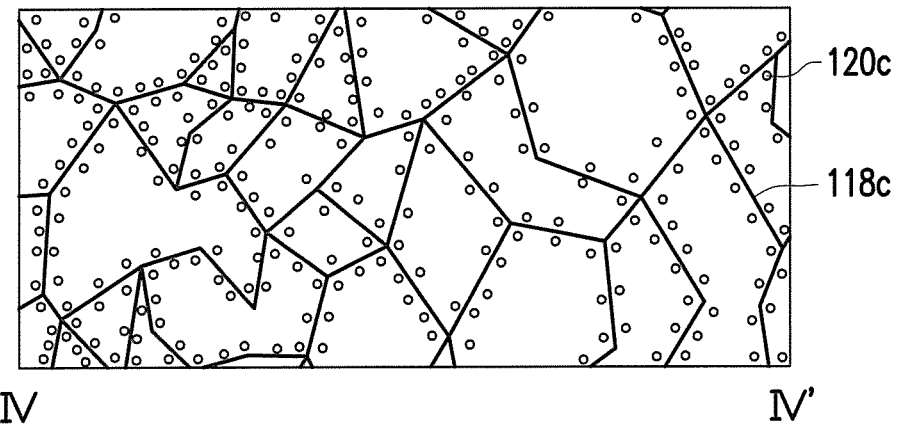
FIG. 2D is a cross-sectional schematic diagram along section line VI-VI' in FIG. 1.
Figure 2E:
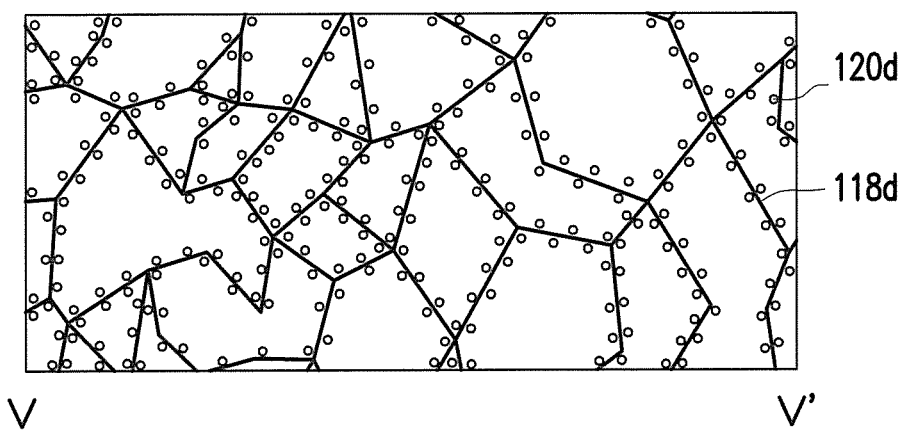
FIG. 2E is a cross-sectional schematic diagram along section line V-V' in FIG. 1.
Figure 2F:
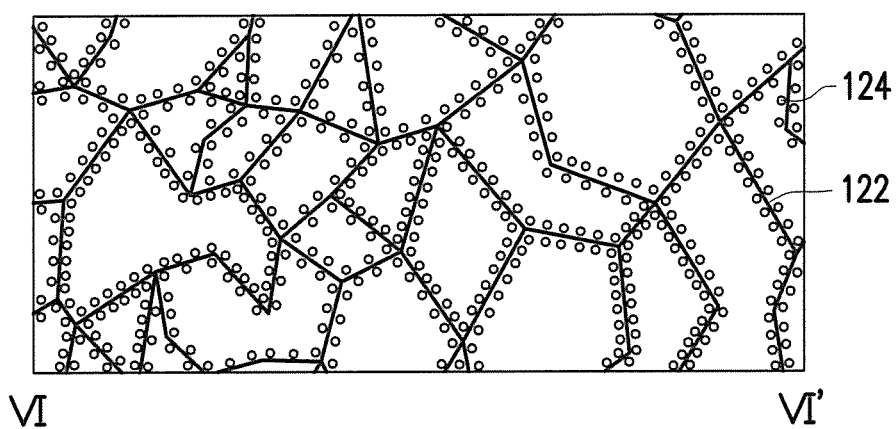
FIG. 2F is a cross-sectional schematic diagram along section line VI-VI' in FIG. 1.

FIG. 1 is a three-dimensional schematic diagram of a reactor according to an embodiment of the invention. FIG. 2A is a cross-sectional schematic diagram along section line I-I' in FIG. 1. FIG. 2B is a cross-sectional schematic diagram along section line II-II' in FIG. 1. FIG. 2C is a cross-sectional schematic diagram along section line III-III' in FIG. 1. FIG. 2D is a cross-sectional schematic diagram along section line VI-VI' in FIG. 1. FIG. 2E is a cross-sectional schematic diagram along section line V-V' in FIG. 1. FIG. 2F is a cross-sectional schematic diagram along section line VI-VI' in FIG. 1.

Referring to FIG. 1 and FIG. 2A to FIG. 2F, the present embodiment provides a reactor 100. The reactor 100 is suitable for a reaction containing an exothermic reaction. The exothermic reaction includes an oxidative steam reforming of methanol, a methanol partial oxidation reaction, a sulfur dioxide oxidation reaction, or an ethylene partial oxidation reaction. In the present embodiment, the exothermic reaction is exemplified by a methanol partial oxidation reaction, wherein products (such as hydrogen) of the methanol partial oxidation reaction are used as the raw materials of a fuel cell. The reactor 100 includes a reaction channel 106, a front-end catalyst support 114, a front-end catalyst 116, middle-end catalyst supports 118a to 118d, middle-end catalysts 120a to 120d, a back-end catalyst support 122, and a back-end catalyst 124.

The reaction channel 106 has an inlet 102 and an outlet 104. The reaction channel 106 includes a front-end reaction zone 108, middle-end reaction zones 110a to 110d, and a back-end reaction zone 112 from the inlet 102 to the outlet 104. The geometric shape of the reaction channel 106 includes spiral, bellow, a microreactor chamber array, or a parallel straight tube array.

In the present embodiment, the reaction channel 106 is exemplified by 4 middle-end reaction zones (110a to 110d). However, the invention is not limited to the number of the middle-end reaction zones, and those having ordinary skill in the art can adjust the number of the middle-end reaction zone according to, for instance, design requirements of the reactor. The front-end reaction zone 108, the middle-end reaction zones 110a to 110d, and the back-end reaction zone 112 can be separately disposed or connected to one another. In the present embodiment, the front-end reaction zone 108, the middle-end reaction zones 110a to 110d, and the back-end reaction zone 112 are separately disposed as an example, but the invention is not limited thereto. Moreover, those having ordinary skill in the art can also adjust the lengths of the front-end reaction zone 108, the middle-end reaction zones 110a to 110d, and the back-end reaction zone 112 according to, for instance, the design requirements of the reaction channel 106.

The front-end catalyst support 114, the middle-end catalyst supports 118a to 118d, and the back-end catalyst support 122 are respectively located in the front-end reaction zone 108, the middle-end reaction zones 110a to 110d, and the back-end reaction zone 112. The materials of the front-end catalyst support 114, the middle-end catalyst supports 118a to 118d, and the back-end catalyst support 122 include metal foam, ceramic foam, or ceramic particles. In the present embodiment, the materials of the front-end catalyst support 114, the middle-end catalyst supports 118a to 118d, and the back-end catalyst support 122 are the same as an example, but the invention is not limited thereto. However, in other embodiments, the materials of the front-end catalyst support 114, the middle-end catalyst supports 118a to 118d, and the back-end catalyst support 122 can also be different.

The front-end catalyst 116, the middle-end catalysts 120a to 120d, and the back-end catalyst 124 are respectively located on the front-end catalyst support 114, the middle-end catalyst supports 118a to 118d, and the back-end catalyst support 122. The materials of the front-end catalyst 116, the middle-end catalysts 120a to 120d, and the back-end catalyst 124 include copper-palladium-cerium-zinc catalyst, copper-manganese-zinc catalyst, vanadium pentoxide, or silver. In the present embodiment, the materials of the front-end catalyst 116, the middle-end catalysts 120a to 120d, and the back-end catalyst 124 are the same as an example, but the invention is not limited thereto. In other embodiments, the materials of the front-end catalyst 116, the middle-end catalysts 120a to 120d, and the back-end catalyst 124 can also be different.

The concentration of the front-end catalyst 116 in the front-end reaction zone 108 is less than the concentration of the back-end catalyst 124 in the back-end reaction zone 112. In the entire text, the mentioned catalyst concentrations (such as the concentration of the front-end catalyst 116, the concentrations of the middle-end catalysts 120a to 120d, and the concentration of the back-end catalyst 124) represent the mole numbers of the catalysts located at active sites per unit volume, and are affected by the catalyst content per unit volume and the specific surface area of the catalyst support. Specifically, the front-end reaction zone 108 is close to the inlet 102 in the reaction channel 106, and therefore the reactant (methanol and oxygen in the present embodiment) concentrations in the front-end reaction zone 108 are greater than the reactant concentrations in the back-end reaction zone 112. Therefore, when the concentration of the front-end catalyst 116 in the front-end reaction zone 108 is greater than or equal to the concentration of the back-end catalyst 124 in the back-end reaction zone 112, since the exothermic reaction in the front-end reaction zone 108 is more violent, local high-temperature generation readily occurs in the front-end reaction zone 108 such that the issue of catalyst sintering occurs. Moreover, the local high temperature in certain exothermic reactions further increases the yield of harmful byproducts. For instance, when the temperature in the methanol partial oxidation reaction exceeds 200° C., the yield of the byproduct carbon monoxide is increased. In the case that carbon monoxide is used as the raw material of a fuel cell along with the products of the methanol partial oxidation reaction, the issue of poisoning is present in the fuel cell. In the invention, since the concentration of the front-end catalyst 116 in the front-end reaction zone 108 is less than the concentration of the back-end catalyst 124 in the back-end reaction zone 112, the phenomenon of catalyst sintering caused by local high-temperature generation in the front-end reaction zone 108 can be inhibited, such that the service life of the front-end catalyst 116 is extended. Moreover, the issue of increased yield of harmful byproducts in certain exothermic reactions can be further alleviated.

The specific surface area of the front-end catalyst support 114 can be less than or equal to the specific surface area of the back-end catalyst support 122. Those having ordinary skill in the art can know that, a greater specific surface area of the catalyst support indicates a greater surface area of the catalyst support per unit mass can be covered by the catalyst, that is, the catalyst can be covered on the catalyst support per unit mass in a greater amount. Therefore, when the specific surface area of the front-end catalyst support 114 is less than or equal to the specific surface area of the back-end catalyst support 122, local high temperature caused by a violent exothermic reaction in the front-end reaction zone 108 can be better prevented, such that catalyst sintering and the phenomenon of increased yield of harmful byproducts in certain exothermic reactions can be inhibited. In the present embodiment, the specific surface areas of the front-end catalyst support 114, the middle-end catalyst supports 118a to 118d, and the back-end catalyst support 122 are the same as an example, but the invention is not limited thereto. In another embodiment, the specific surface area of the front-end catalyst support 114 can also be less than the specific surface area of the back-end catalyst support 122. Moreover, in other embodiments, the specific surface area of the front-end catalyst support 114, the specific surface areas of the middle-end catalyst supports 118a to 118d, and the specific surface area of the back-end catalyst support 122 can also be increased in order.

In the present embodiment, the materials of the front-end catalyst support 114, the middle-end catalyst supports 118a to 118d, and the back-end catalyst support 122 are metal foam or ceramic foam, and therefore the specific surface areas of the catalyst supports can be adjusted by adjusting the porosity and the aperture of the metal foam or the ceramic foam. In general, by increasing the porosity and reducing the aperture, the specific surface areas of the catalyst supports can be increased. In other embodiments, the materials of the front-end catalyst support 114, the middle-end catalyst supports 118a to 118d, and the back-end catalyst support 122 can also be ceramic particles. At this point, the specific surface areas of the catalyst supports can be adjusted by adjusting the particle size and the number of the ceramic particles. Specifically, by reducing the particle size and increasing the number, the specific surface areas of the catalyst supports can be increased.

The concentrations of the middle-end catalysts 120a to 120d in the middle-end reaction zones 110a to 110d are decided by a computer simulation of reaction parameters, wherein the reaction parameters include size and geometric shape of the reaction channel 106.

In addition to the issue that local high temperature readily occurs in the front-end reaction zone 108, the size and the geometric shape of the reaction channel 106 may also cause local high-temperature generation in the middle-end reaction zones 110a to 110d.

For instance, the geometric shape of the reaction channel 106 in the present embodiment is spiral, local high temperature is readily generated in the middle-end reaction zones 110a to 110d such that catalyst sintering occurs, and the issue of increased yield of harmful byproducts in certain exothermic reactions occurs. Although the middle-end catalysts 120a to 120d having lower concentrations are disposed in the middle-end reaction zones 110a to 110d, thus facilitating the inhibition of the phenomenon of local high-temperature generation in the middle-end reaction zones 110a to 110d, when the concentrations of the middle-end catalysts 120a to 120d are too low, the heat generated in the exothermic reaction is insufficient to maintain a suitable reaction temperature, such that the yield of the exothermic reaction is reduced. For instance, in the methanol partial oxidation reaction, when the reaction temperature is less than 160° C., the reaction yield is significantly reduced. Therefore, by performing computer simulation on reaction parameters such as size and geometric shape of the reaction channel 106, the optimal concentrations of the middle-end catalysts 120a to 120d in the middle-end reaction zones 110a to 100d can be respectively calculated to alleviate the issue of catalyst sintering generated in the middle-end reaction zones 110a to 110d, such that the service lives of the middle-end catalysts 120a to 120d are extended, and increased yield of harmful byproducts in certain exothermic reactions can be prevented. Moreover, yield reduction of the exothermic reaction caused by low concentrations of the middle-end catalysts 120a to 120d can be further prevented.

The reaction parameters can further optionally include at least one of a reaction heat of the exothermic reaction, concentrations and flow rates of the reactants, thermal conductivities and specific surface areas of the middle-end catalyst supports 118a to 118d, thermal conductivities of the middle-end catalysts 120a to 120d, and thermal conductivity of the reaction channel 106, and the optimal concentrations of the middle-end catalyst supports 118a to 118d can be more accurately calculated by computer simulation.

Moreover, the concentration of the back-end catalyst 124 in the back-end reaction zone 112 can be greater than the concentrations of the middle-end catalysts 120a to 120d in the middle-end reaction zones 110a to 110d, and the concentrations of the middle-end catalysts 120a to 120d in the middle-end reaction zones 110a to 110d can be greater than the concentration of the front-end catalyst 116 in the front-end reaction zone 108. That is, the concentrations of the middle-end catalysts 120a to 120d can be between the concentration of the front-end catalyst 116 and the concentration of the back-end catalyst 124.

According to the results of the computer simulation calculation, the concentrations of the middle-end catalysts 120a to 120d in the middle-end reaction zones 110a to 110d can be the same or different values according to the results of the computer simulation calculation. In an embodiment, the mode of change from the concentration of the middle-end catalyst 120a closest to the inlet 102 to the concentration of the middle-end catalyst 120d closest to the outlet 104 can be monotonically increasing, monotonically decreasing, or a combination thereof. In another embodiment, the concentrations of the middle-end catalysts 120a to 120d in the middle-end reaction zones 110a to 110d can also be the same.

Moreover, the concentration of the front-end catalyst 116 in the front-end reaction zone 108 and the concentration of the back-end catalyst 124 in the back-end reaction zone 112 can also be decided by the computer simulation of the reaction parameters. At this point, the reaction parameters can further optionally include at least one of thermal conductivities and specific surface areas of the front-end catalyst support 114 and the back-end catalyst support 122, thermal conductivities of the front-end catalyst 116 and the back-end catalyst 124, and thermal conductivity of the reaction channel 106. Similar to deciding the concentrations of the middle-end catalysts 120a to 120d in the middle-end reaction zones 110a to 110d by the computer simulation above, the concentration of the front-end catalyst 116 in the front-end reaction zone 108 and the concentration of the back-end catalyst 124 in the back-end reaction zone 112 are decided by performing the computer simulation, such that local high-temperature generation in the front-end reaction zone 108 can be further prevented, such that the service life of the front-end catalyst 116 is extended, and the issue of increased yield of harmful byproducts in certain exothermic reactions can be alleviated. Moreover, yield reduction of the exothermic reaction caused by low concentrations of the front-end catalyst 116 and the back-end catalyst 124 can be further prevented.

It can be known from the above embodiments that, in the reactor 100, since the concentration of the front-end catalyst 116 in the front-end reaction zone 108 is less than the concentration of the back-end catalyst 124 in the back-end reaction zone 112, the phenomenon of local high-temperature generation in the front-end reaction zone 108 can be effectively inhibited. Moreover, by optimizing the concentrations of the middle-end catalysts 120a to 120d in each of the middle-end reaction zones 110a to 110d according to a computer simulation of size and geometric shape of the reaction channel 106, local high-temperature generation in the middle-end reaction zones 110a to 110d caused by high concentrations of the middle-end catalysts 120a to 120d can be prevented. Therefore, the reactor 100 can have a longer catalyst service life, and the issue of increased yield of harmful byproducts in certain exothermic reactions can be alleviated. Moreover, the concentrations of the middle-end catalysts 120a to 120d are calculated by computer simulation, and therefore yield reduction of the exothermic reaction caused by low concentrations of the middle-end catalyst can be prevented. Moreover, since the reactor provided by the invention can be made of various materials, and is suitable for various sizes, the range of application of the invention can be not limited by the type of the material and the size of the reactor.

Figure 3:
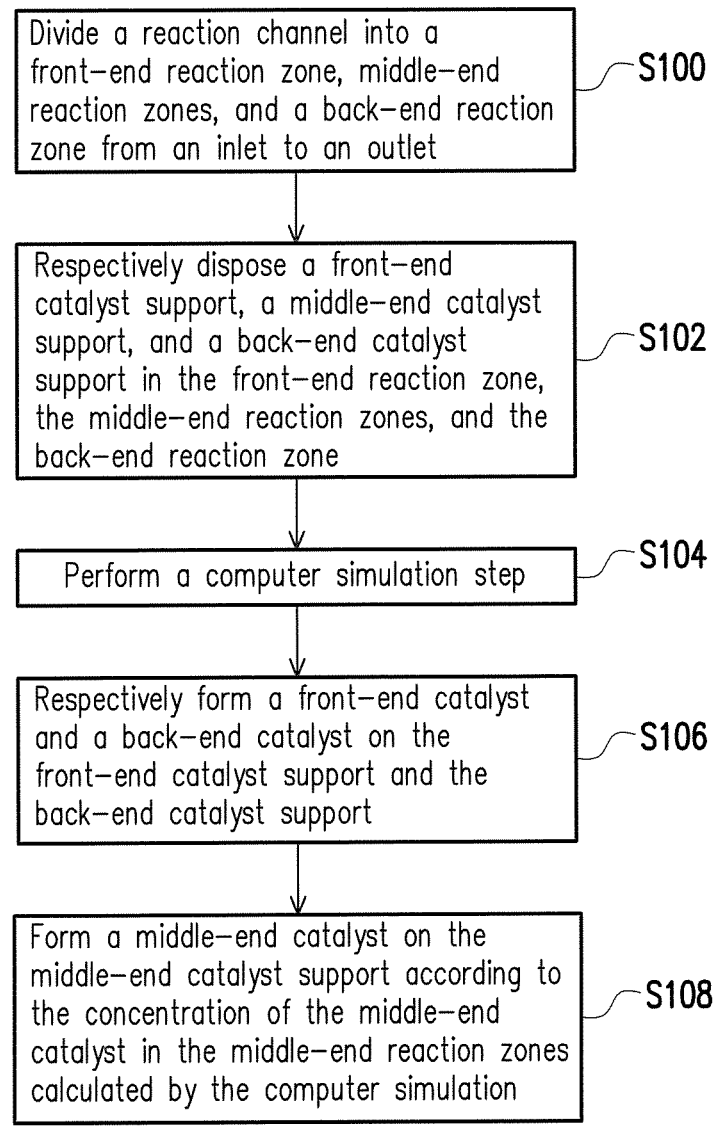
FIG. 3 is a flowchart of a reactor temperature control method according to an embodiment of the invention.

FIG. 3 is a flowchart of a reactor temperature control method according to an embodiment of the invention. In the present embodiment, the reactor 100 of the above embodiments is used to describe the reactor temperature control method, but the invention is not limited thereto.

Referring to all of FIG. 1, FIG. 2A to FIG. 2F, and FIG. 3, step S100 is performed, in which the reaction channel 106 is divided into the front-end reaction zone 108, the middle-end reaction zones 110a to 110d, and the back-end reaction zone 112 from the inlet 102 to the outlet 104.

Step S102 is performed, in which the front-end catalyst support 114, the middle-end catalyst supports 118a to 118d, and the back-end catalyst support 122 are respectively disposed in the front-end reaction zone 108, the middle-end reaction zones 110a to 110d, and the back-end reaction zone 112.

Step S104 is performed, in which a computer simulation step is performed. Specifically, the concentrations of the middle-end catalysts 120a to 120d in the middle-end reaction zones 110a to 110d are calculated according to the reaction parameters. The reaction parameters include size and geometric shape of the reaction channel 106, and can further optionally include at least one of a reaction heat of the exothermic reaction, concentrations and flow rates of the reactants, thermal conductivities and specific surface areas of the middle-end catalyst supports 118a to 118d, thermal conductivities of the middle-end catalysts 120a to 120d, and thermal conductivity of the reaction channel 106.

Therefore, the concentrations of the middle-end catalysts 120a to 120d in the middle-end reaction zones 110a to 110d can be respectively calculated to prevent local high-temperature generation in the middle-end reaction zones 110a to 110d, such that the service lives of the middle-end catalysts 120a to 120d are extended, and the issue of increased yield of harmful byproducts in certain exothermic reactions is alleviated. Moreover, yield reduction caused by low concentrations of the middle-end catalysts 120a to 120d can be further prevented.

Step S106 is performed, in which the front-end catalyst 116 and the back-end catalyst 124 are respectively formed on the front-end catalyst support 114 and the back-end catalyst support 122. The concentration of the front-end catalyst 116 in the front-end reaction zone 108 is less than the concentration of the back-end catalyst 124 in the back-end reaction zone 112, and therefore the phenomenon of local high-temperature generation in the front-end reaction zone 108 can be inhibited, such that the service life of the front-end catalyst 116 can be extended, and the issue of increased yield of harmful byproducts in certain exothermic reactions can be alleviated. The method of respectively forming the front-end catalyst 116 and the back-end catalyst 124 on the front-end catalyst support 114 and the back-end catalyst support 116 includes an immersion method, a coprecipitation method, a precipitation method, a sol-gel method, a polyol method, a chemical vapor deposition method, or a combination thereof.

Step S108 is performed, in which the middle-end catalysts 120a to 120d are formed on the middle-end catalyst supports 118a to 118d according to the concentrations of the middle-end catalysts 120a to 120d in the middle-end reaction zones 110a to 110d calculated by computer simulation. The method of forming the middle-end catalysts 120a to 120d on the middle-end catalyst supports 118a to 118d includes an immersion method, a coprecipitation method, a precipitation method, a sol-gel method, a polyol method, a chemical vapor deposition method, or a combination thereof.

The concentration of the back-end catalyst 124 in the back-end reaction zone 112 can be greater than the contents of the middle-end catalysts 120a to 120d in the middle-end reaction zones 110a to 110d, and the concentrations of the middle-end catalysts 120a to 120d in the middle-end reaction zones 110a to 110d can be greater than the concentration of the front-end catalyst 116 in the front-end reaction zone 108. Specifically, the concentrations of the middle-end catalysts 120a to 120d in the middle-end reaction zones 110a to 110d are decided to be the same or different values according to step S104, but the concentrations of the middle-end catalysts 120a to 120d can be between the concentration of the front-end catalyst 116 in the front-end reaction zone 108 and the concentration of the back-end catalyst 124 in the back-end reaction zone 112.

In an embodiment, according to the results of the computer simulation calculation, the mode of change from the concentration of the middle-end catalyst 120a closest to the inlet 102 to the concentration of the middle-end catalyst 120d closest to the outlet 104 can be monotonically increasing, monotonically decreasing, or a combination thereof. In another embodiment, the concentrations of the middle-end catalysts 120a to 120d in the middle-end reaction zones 110a to 110d can also be the same.

In another embodiment, step S104 can further optionally include calculating the concentration of the front-end catalyst 116 in the front-end reaction zone 108 and the concentration of the back-end catalyst 124 in the back-end reaction zone 112 according to the reaction parameters. At this point, the reaction parameters can further optionally include at least one of thermal conductivities and specific surface areas of the front-end catalyst support 114 and the back-end catalyst support 122, thermal conductivities of the front-end catalyst 116 and the back-end catalyst 124, and thermal conductivity of the reaction channel 106. Accordingly, in step S106, the concentration of the front-end catalyst 116 in the front-end reaction zone 108 and the concentration of the back-end catalyst 124 in the back-end reaction zone 112 can be decided according to the computer simulation calculation results of step S104.

Moreover, the catalyst concentration in each of the reaction zones can be controlled by adjusting the aperture or the particle size of the catalyst support. Moreover, when an immersion method is adopted to form the catalyst, the catalyst concentration in each of the reaction zones can be controlled by adjusting the concentration of the immersion solution. Of course, the catalyst concentration in each of the reaction zones can be controlled by adjusting the aperture or the particle size of the catalyst support and adjusting the concentration of the immersion solution at the same time.

It can be known from the above that, by setting the catalyst concentrations of the front-end catalyst 116, the middle-end catalysts 120a to 120d, and the back-end catalyst 124 via the reaction temperature control method of the above embodiments, the phenomenon of local high temperature in the front-end reaction zone 108 and the middle-end reaction zones 110a to 110d can be effectively inhibited, such that the service life of the catalyst can be extended, and the issue of increased yield of harmful byproducts in certain exothermic reactions is alleviated. Moreover, the middle-end catalyst 120a to 120d concentrations are calculated by computer simulation, and therefore yield reduction of the exothermic reaction caused by low concentration of the middle-end catalyst can be prevented. Moreover, since the reactor temperature control method provided by the invention can be suitable for reactors made of various materials, and can be suitable for reactors of various sizes, the range of application of the invention can be not limited by the type of the material and the size of the reactor.

An experimental example is provided below to verify the efficacy of the invention. However, the invention is not limited to the content of the following experimental example.

Experimental Example

Please refer to all of FIG. 1, FIG. 2A to FIG. 2F, and FIG. 3. In the present experimental example, the reactor 100 is used to perform a methanol partial oxidation reaction, the reaction heat thereof is −186 kJ/mol, and the reaction temperature is preferably in the range of 180° C. to 200° C., preferably about 190° C. If the reaction temperature is less than 160° C., then the reaction at this point is slow and the resulting reaction heat is insufficient for self-sustaining the reaction. On the other hand, if the reaction temperature is greater than 200° C., then the yield of the byproduct carbon monoxide is increased. In the case that carbon monoxide is used as the raw material of a fuel cell along with the products of the methanol partial oxidation reaction, the issue of poisoning is present in the fuel cell.

The reaction channel 106 is a spiral reaction channel, and the cross-sectional area thereof is 2 mm×2 mm, the sidewall thickness thereof is 1 mm, the total length of the reaction catalyst zone thereof is 3.5 cm, and the thermal conductivity thereof is 401 W/(m·K). The concentrations of methanol and oxygen used as reactants are respectively 12.2 mol/m$^3$ and 6.1 mol/m$^3$, and the feed rate of methanol and oxygen mixed gas is 12 SCCM. The materials of the front-end catalyst support 114, the middle-end catalyst supports 118a to 118d, and the back-end catalyst support 122 are all copper foam and the porosities thereof are 0.9. Since the thermal conductivity of the body (without pores) of the copper foam is 337 W/(m·K), the thermal conductivity of the overall (including pores) copper foam is 33.7 W/(m·K) (337 W/(m·K)× (1−0.9 (porosity)=33.7 W/(m·K)). Moreover, the specific surface areas of the front-end catalyst support 114, the middle-end catalyst supports 118 to 118d, and the back-end catalyst support 122 are the same. The materials of the front-end catalyst 116, the middle-end catalysts 120a to 120d, and the back-end catalyst 124 are copper-manganese-zinc alloys, and when the temperature thereof exceeds 360° C., catalyst sintering readily occurs, thus causing catalyst failure.

In the present experimental example, the temperature of the reactor 100 is controlled according to step S100 to step S108, wherein the front-end catalyst 116, the middle-end catalysts 120a to 120d, and the back-end catalyst 124 are respectively formed on the front-end catalyst support 114, the middle-end catalyst supports 118a to 118d, and the back-end catalyst support 122 via an immersion method. The concentrations of the front-end catalyst 116, the middle-end catalysts 120a to 120d, and the back-end catalyst 124 are decided according to the computer simulation of step S104, and the results thereof are as shown in Table 1 below.

TABLE 1

| Catalyst | Catalyst concentration (mole number of catalyst located at active site per unit volume) |
|---|---|
| Front-end catalyst 116 | 1.3 |
| Middle-end catalyst 120a | 1.6 |
| Middle-end catalyst 120b | 1.5 |
| Middle-end catalyst 120c | 2.1 |
| Middle-end catalyst 120d | 2.6 |
| Back-end catalyst 124 | 3.5 |

Comparative Example 1

The difference between comparative example 1 and the experimental example is that: the computer simulation is not performed in comparative example 1 according to step S104, and the concentrations of the front-end catalyst 116, the middle-end catalysts 120a to 120d, and the back-end catalyst 124 are fixed at 3.5 mol/m$^3$.

Comparative Example 2

The difference between comparative example 2 and the experimental example is that: the computer simulation is not performed in comparative example 2 according to step S104, and the concentrations of the front-end catalyst 116, the middle-end catalysts 120a to 120d, and the back-end catalyst 124 are set to a monotonically increasing series of 1.3 mol/m$^3$ to 3.5 mol/m$^3$, as shown in detail in Table 2 below.

TABLE 2

| Catalyst | Catalyst concentration (mole number of catalyst located at active site per unit volume) |
|---|---|
| Front-end catalyst 116 | 1.3 |
| Middle-end catalyst 120a | 1.74 |
| Middle-end catalyst 120b | 2.18 |
| Middle-end catalyst 120c | 2.62 |
| Middle-end catalyst 120d | 3.06 |
| Back-end catalyst 124 | 3.5 |

Results and Discussion of Experimental Example, Comparative Example 1, and Comparative Example 2

The maximum temperatures and the difference between the maximum temperatures and the minimum temperatures of the experimental example, comparative example 1, and comparative example 2 are as shown in Table 3 below.

TABLE 3

| | Maximum temperature (° C.) | Minimum temperature (° C.) | Difference between maximum temperature and minimum temperature (° C.) |
|---|---|---|---|
| Experimental example | 192 | 188 | 4 |
| Comparative example 1 | 382 | 173 | 209 |
| Comparative example 2 | 217 | 180 | 37 |

It can be known from Table 3 that, the maximum temperature (382° C.) of comparative example 1 is greater than the temperature (360° C.) initiating catalyst sintering, and therefore in comparative example 1, the issue of catalyst sintering readily occurs, such that the service life of the catalyst is reduced, and the yield of the byproduct carbon monoxide is increased at such high temperature. Moreover, the numeric values of the maximum temperature and the difference between the maximum temperature and the minimum temperature of the experimental example are all less than those of comparative example 1 and comparative example 2, and the numeric values of the maximum temperature and the difference between the maximum temperature and the minimum temperature of comparative example 2 are all less than those of comparative example 1. It can therefore be known that, although by setting the concentrations of the front-end catalyst 116, the middle-end catalysts 120a to 120d, and the back-end catalyst 124 to a monotonically increasing series from the inlet 102 to the outlet 104 can already inhibit the phenomenon of local high temperature, the high-temperature inhibiting effect thereof is still less than that of the experimental example. Moreover, in the experimental example, the concentrations of the middle-end catalysts 120a to 120d are optimized by computer simulation, and therefore better high-temperature inhibition effect is achieved.

Moreover, it can be known from Table 3 that, the temperature range of the reactor 100 in the experimental example is 192° C. to 188° C., and the overall temperature thereof is closest to the optimal reaction temperature (190° C.) of the methanol partial oxidation reaction.

Based on the above, the reactor and the temperature control method thereof of the above embodiments can effectively inhibit the phenomenon of catalyst sintering caused by local high-temperature generation in the reaction zones, such that the service life of the catalyst can be extended, and the issue of increased yield of harmful byproducts in certain exothermic reactions is alleviated. Moreover, the concentration of the middle-end catalyst is calculated by computer simulation, and therefore yield reduction of the exothermic reaction caused by low concentration of the middle-end catalyst can be prevented. Moreover, since the reactor and the temperature control method thereof provided by the invention can be suitable for reactors made of various materials and reactors of various sizes, the range of application thereof can be not limited by the type of the material and the size of the reactor.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A reactor suitable for a reaction containing an exothermic reaction, wherein the reactor comprises:
    a reaction channel having an inlet and an outlet, and the reaction channel has a front-end reaction zone, middle-end reaction zones, and a back-end reaction zone from the inlet to the outlet;
    a front-end catalyst support, a middle-end catalyst support, and a back-end catalyst support are respectively located in the front-end reaction zone, the middle-end reaction zones, and the back-end reaction zone; and
    a front-end catalyst, a middle-end catalyst, and a back-end catalyst are respectively located on the front-end catalyst support, the middle-end catalyst support, and the back-end catalyst support, wherein
    a concentration of the front-end catalyst in the front-end reaction zone is less than a concentration of the back-end catalyst in the back-end reaction zone, and a concentration of the middle-end catalyst in each of the middle-end reaction zones is decided by a computer simulation of reaction parameters, and the reaction parameters comprise a size and a geometric shape of the reaction channel, and
    wherein the geometric shape of the reaction channel comprises spiral, bellow, or a microreactor chamber array.

2. The reactor of claim 1, wherein the exothermic reaction comprises an oxidative steam reforming of methanol, a methanol partial oxidation reaction, a sulfur dioxide oxidation reaction, or an ethylene partial oxidation reaction.

3. The reactor of claim 1, wherein the front-end reaction zone, the middle-end reaction zones, and the back-end reaction zone are separately disposed from one another.

4. The reactor of claim 1, wherein materials of the front-end catalyst, the middle-end catalyst, and the back-end catalyst comprise copper-palladium-cerium-zinc catalyst, copper-manganese-zinc catalyst, vanadium pentoxide, or silver.

5. The reactor of claim 1, wherein materials of the front-end catalyst support, the middle-end catalyst support, and the back-end catalyst support comprise metal foam, ceramic foam, or ceramic particles.

6. The reactor of claim 1, wherein a specific surface area of the front-end catalyst support is less than or equal to a specific surface area of the back-end catalyst support.

7. The reactor of claim 1, wherein the reaction parameters further comprise at least one of a reaction heat of the exothermic reaction, concentrations and flow rates of reactants, a thermal conductivity and a specific surface area of the middle-end catalyst support, a thermal conductivity of the middle-end catalyst, and a thermal conductivity of the reaction channel.

8. The reactor of claim 1, wherein the concentration of the back-end catalyst is greater than the concentration of the middle-end catalyst, and the concentration of the middle-end catalyst is greater than the concentration of the front-end catalyst.

9. The reactor of claim 8, wherein a mode of change from the concentration of the middle-end catalyst closest to the inlet to the concentration of the middle-end catalyst closest to the outlet comprises monotonically increasing, monotonically decreasing, or a combination thereof.

10. The reactor of claim 8, wherein the concentrations of the middle-end catalyst in the middle-end reaction zones are the same.

11. The reactor of claim 1, wherein the concentration of the front-end catalyst and the concentration of the back-end catalyst are decided by the computer simulation of the reaction parameters.

12. The reactor of claim 11, wherein the reaction parameters further comprise at least one of thermal conductivities and specific surface areas of the front-end catalyst support and the back-end catalyst support, thermal conductivities of the front-end catalyst and the back-end catalyst, and a thermal conductivity of the reaction channel.

* * * * *